United States Patent [19]

Vanden Brink

[11] Patent Number: 4,625,603

[45] Date of Patent: Dec. 2, 1986

[54] VERTICAL CUTOFF SAW WITH FEED RATE CONTROL

[75] Inventor: Donald J. Vanden Brink, Wyoming, Mich.

[73] Assignee: Tannewitz, Inc., Grand Rapids, Mich.

[21] Appl. No.: 758,816

[22] Filed: Jul. 25, 1985

[51] Int. Cl.$^4$ .................... B23D 53/04; B27B 13/00
[52] U.S. Cl. ................................ 83/74; 83/794; 83/801
[58] Field of Search .................. 83/74, 794, 797, 789, 83/795, 801

[56] References Cited

U.S. PATENT DOCUMENTS

| | | |
|---|---|---|
| Re. 25,901 | 11/1965 | Whitmore . |
| 2,754,567 | 7/1956 | Crane . |
| 2,815,561 | 12/1957 | Crane . |
| 3,592,094 | 7/1971 | Greenblatt . |
| 3,680,417 | 8/1972 | Wells . |
| 3,991,644 | 11/1976 | Sugimoto . |
| 4,016,787 | 4/1977 | Sugimoto . |
| 4,165,663 | 8/1979 | Tsutsui et al. ................. 83/74 |
| 4,237,757 | 12/1980 | Bonac . |
| 4,357,848 | 11/1982 | Sakurai et al. . |
| 4,358,974 | 11/1982 | Sakurai . |
| 4,437,367 | 3/1984 | Hauser . |

Primary Examiner—Donald R. Schran
Attorney, Agent, or Firm—Price, Heneveld, Huizenga & Cooper

[57] ABSTRACT

The specification discloses a vertical cutoff saw capable of maintaining relatively constant band loading. The saw includes a carriage, a frame supported on the carriage, and a saw band supported by the frame. The frame is horizontally shiftable with respect to the carriage, and a load sensor is mounted between the frame and carriage to sense the relative horizontal force between the frame and carriage to provide an indication of band loading. A variable speed drive transports the carriage responsive to the load sensor to maintain a desired band load.

13 Claims, 6 Drawing Figures

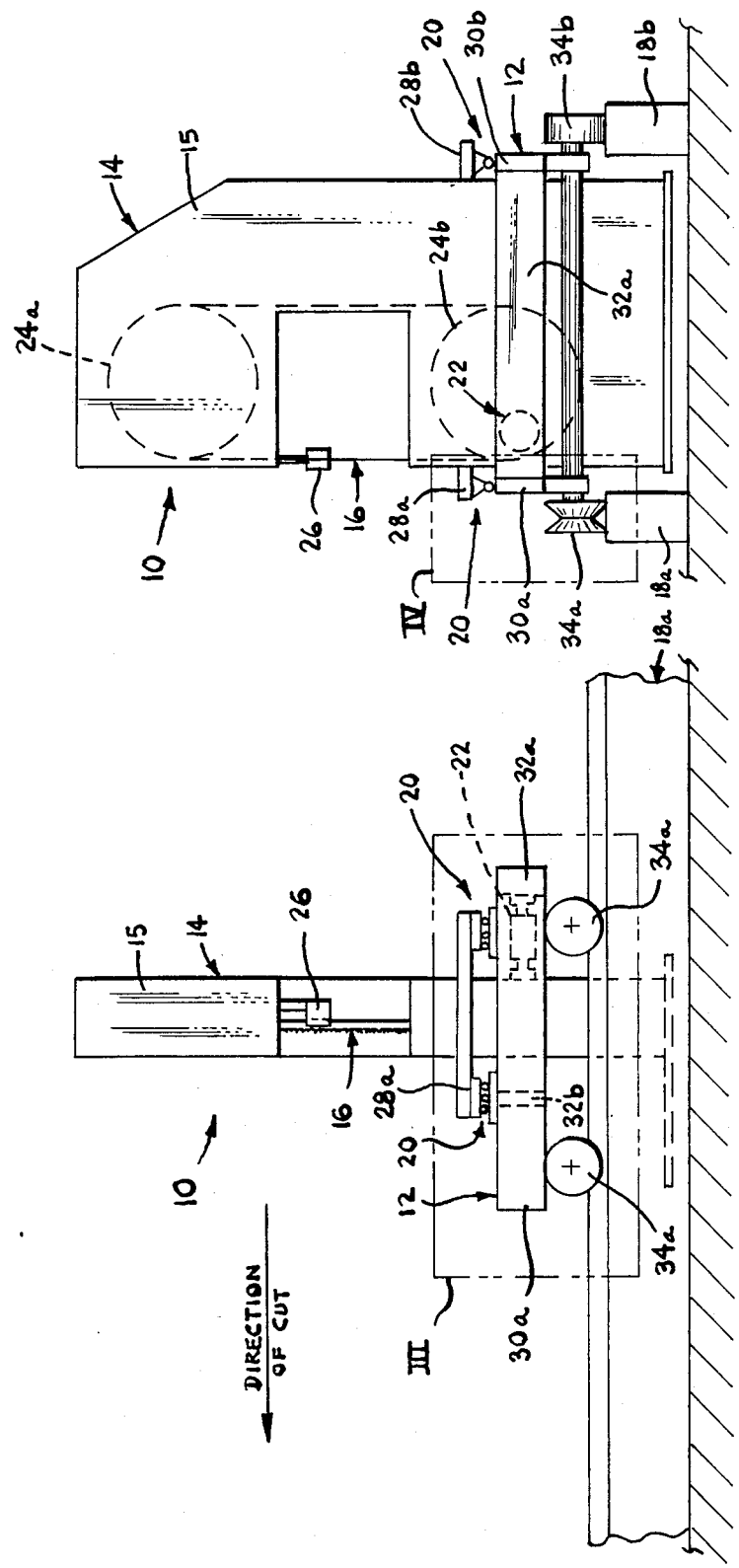

VERTICAL CUTOFF SAW WITH FEED RATE CONTROL

BACKGROUND OF THE INVENTION

The present invention relates to cutoff saws, and more particularly to vertical band cutoff saws.

A wide variety of cutoff saws has been developed for cutting off plates, merchant bars, extruded and rolled shapes, and the like. In particular, band cutoff saws are particularly useful for cutting off gates and sprues of brass, bronze, and iron castings and for cutting off high-speed and stainless steel. The kerf or width of the cut in a band saw is relatively small with a consequent small loss of expensive cut material One particularly effective vertical band cutoff saw is that sold as Model GV1NE by Tannewitz, Inc., of Grand Rapids, Mich., the assignee of the present invention. This saw includes a rail-mounted drive carriage supporting the band. The material to be cut is held stationary, while the saw band is carried through the material by the carriage riding on the rails. The saw carriage is driven at a selected constant feed rate through the material.

It is known in the art that a saw element, such as a band, will have the longest life if the load on the band is generally uniform during cutting. Too great a load, and even too light a load, are detrimental to the blade's life causing excessive wear and dulling. With constant-speed feed drive, the load on the saw band can vary greatly as it passes through material. Variations in band load are created partly by "hard spots" and/or "soft spots" in the material. Other variations in band load are occassioned by materials having nonuniform cross sections throughout the length of the cut, such as rods and pipe. Constant feed rates in band cutoff saws therefore result in varying band loads which detract from the life of the band.

In general, methods and apparatuses have been developed for estimating and/or approximating the band load and controlling the cutting element speed and/or feed rate in response thereto in an attempt to provide a uniform band load. However, these methods and apparatuses are either not particularly accurate or not adaptable to vertical band cutoff saws.

For example, circular cutoff saws include a circular rotating blade and a drive mechanism for carrying material through the rotating blade. At least one prior artisan has sensed the saw motor speed and regulated the feed rate in response thereto. As the rpm decreases, it is assumed that the load on the blade has increased; and the feed velocity of the material is reduced to decrease the blade load. Conversely, if the load on the saw blade decreases, the motor speed increases; and the feed rate is increased to increase the blade load. However, the control delay in this arrangement is unacceptably slow for many applications. This is particularly so in band saws wherein the momentum of the wheels carrying the band is relatively large.

In horizontal band saws, the blade is oriented generally horizontally, and the saw frame supporting the band travels downwardly under gravity to carry the band through the material. The downward force of the saw frame can be monitored to provide an estimation of the band load. For example, a relatively large downward force or weight indicates that the band is lightly loaded, while a relatively light downward force indicates that the saw band is heavily loaded. Using this force information, the descent rate of the saw frame can be controlled to maintain a relatively constant band force. Examples of such horizontal cutoff saw control systems are illustrated in U.S. Pat. No. 4,358,974, issued Nov. 16, 1982, to Sakurai, entitled METHOD AND APPARATUS FOR CONTROLLING THE FEEDING OF A BANDSAW BLADE OF HORIZONTAL BAND SAW MACHINES; U.S. Pat. No. 4,357,848, issued Nov. 9, 1982, to Sakurai et al, entitled METHOD AND APPARATUS FOR CONTROLLING THE FEEDING OF A BANDSAW BLADE OF HORIZONTAL BANDSAW MACHINES; U.S. Pat. Nos. 4,016,787 and 3,991,644, issued Apr. 12, 1977, and Nov. 16, 1976, respectively, to Sugimoto, entitled METHOD FOR CONTROLLING THE CUTTING FEED SPEED OF A SAW FRAME OF BAND-SAWING MACHINE OR SIMILAR MACHINE. However, this control utilizing the "apparent weight" of the frame is not usable in vertical cutoff saws wherein the direction of the cut is generally perpendicular to the force of gravity.

Another prior artisan has incorporated load sensors into the saw band guides of a vertical band saw. The force exerted on the guide by the band is monitored, and the feed rate of the material is regulated to maintain a relatively uniform load as detected by the load sensors. Examples of this construction are illustrated in U.S. Pat. Nos. 2,815,561 and 2,754,567, issued Dec. 10, 1957, and July 17, 1956, respectively, to Crane, entitled AUTOMATIC FEED CONTROL APPARATUS FOR MACHINE TOOLS. However, the incorporation of the load sensors into the relatively compact, "dirty", and hostile environment of the saw band guides can often result in inadequate performance and a requirement for frequent servicing.

SUMMARY OF THE INVENTION

The aforementioned problems are overcome in the present invention wherein a vertical cutoff saw includes control structure for accurately monitoring the band load and controlling the feed rate of the material with respect to the saw to maintain a generally uniform desired band load. More particularly, the vertical cutoff saw includes a rail-mounted carriage, a frame supported on the carriage, and a saw band or other cutting element supported by the frame. The frame is mounted for horizontal movement with respect to the carriage, and a load sensor is positioned between the frame and the carriage. Further provided is a drive mechanism for moving the carriage and the material to be cut relative one another in a horizontal direction to carry the saw band through the material. A control circuit is operatively coupled to both the load sensor and the drive. The load sensor provides a signal proportional to the horizontal force between the frame and carriage which closely corresponds to the band load or horizontal force on the band. The control circuit regulates the speed of the drive mechanism so that the feed rate is varied to maintain a relatively uniform desired band load.

In a preferred aspect of the invention, the drive mechanism is a hydraulic drive including a proportional valve responsive to the control.

Saw bands utilized on the present saw have a relatively long life because the band load will be relatively constant under all conditions. When "hard spots" or relatively thick cross-sectional portions of the material are encountered, the carriage speed is reduced to maintain generally uniform band loading. Conversely, when "soft spots" or relatively thin cross-sectional areas are encountered, the carriage speed is increased to take advantage of faster cutting where band loading will not be excessive.

These and other objects, advantages, and features of the invention will be more fully understood and appreciated by reference to the detailed description of the preferred embodiment and the drawings.

BRIEF DESCRIPTION OF THE DRAWINGS

FIG. 1 is a schematic side elevational view of the vertical cutoff saw of the present invention;

FIG. 2 is an end elevational view of the saw viewed from the right of FIG. 1;

DETAILED DESCRIPTION OF THE PREFERRED EMBODIMENT

Figure 3:
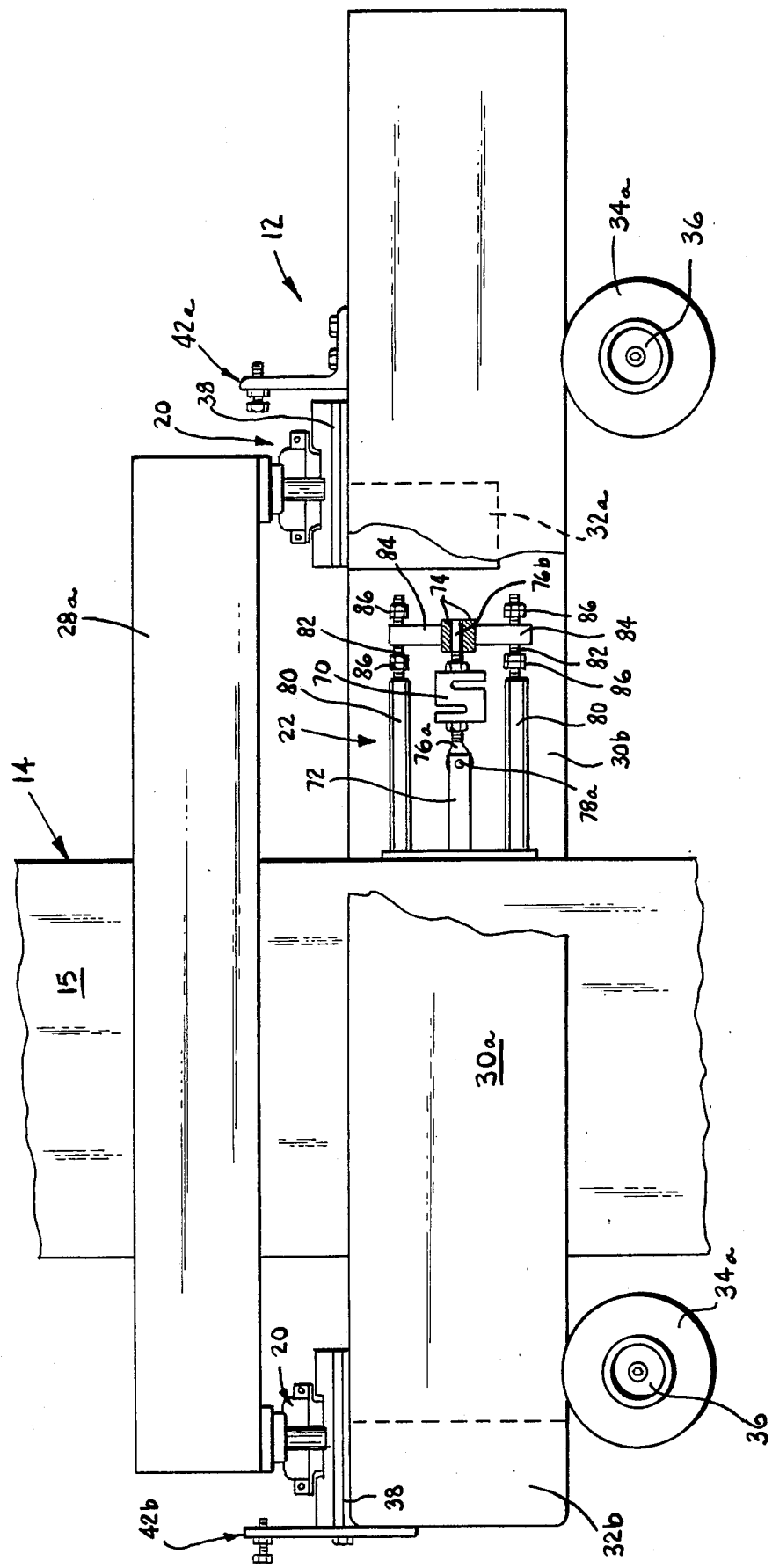
FIG. 3 is an enlarged view of the area within line II in FIG. 1.

A vertical band cutoff saw constructed in accordance with a preferred embodiment of the invention is illustrated in FIGS. 1 and 2 and generally designated 10. Basically, the saw includes a carriage 12, a frame 14 supported on the carriage, and a saw band 16 supported by the frame. The carriage 12 is supported on a rail assembly 18 which in turn rests on the floor. The frame 14 is supported on a pair of slide bearings 20a and 20b for limited horizontal movement with respect to the carriage 12. A load sensor assembly 22 is secured to and between the carriage 12 and the frame 14 to monitor the horizontal load or force therebetween.

During cutting, the carriage 12 is transported to the left as viewed in FIG. 1 to carry the band 16 through the stationary material. The resistive force of the material on the band places a load on the band which in turn creates a load between the relatively reciprocable carriage 12 and frame 14. The load cell assembly 22 monitors this force to provide an indication of band loading. Through an appropriate control circuit to be described, the carriage speed is controlled to maintain the band load relatively constant.

The carriage 12 (FIGS. 1-2) includes a pair of side beams 30a and 30b interconnected by end beams 32a and 32b. Wheels 34a and 34b are mounted on opposite ends of axles 36 which support the carriage side beams 30. Wheels 34a are V-groove wheels to ride on V-rail 18a, while wheels 34b are flat to ride on flat rail 18b. The mating of wheels 34a and the rail 18a guides the saw 10 along a precise linear path. Rails 18 and wheels 34 are generally well known to those having skill in the art and have long been sold in the previously described Tannewitz saw.

The frame 14 (FIGS. 1 and 2) includes a housing 15 generally well known to those having skill in the band cutoff saw art. The housing 15 rotatably supports upper and lower wheels 24a and 24b which in turn carry the saw band 16. A saw motor (not shown) drives the lower wheel 24b and propels the band 16. Preferably, the frame 14 further includes a pair of saw guides, only the upper one of which 26, is visible to support the saw band in the work area where material is cut.

The frame 14 further includes a pair of side rails 28a and 28b (FIGS. 1-3) rigidly secured, for example by welding, to the frame housing 15. The rails 28 are supported on the bearings 20 for limited horizontal movement with respect to the carriage 12.

The saw band 16 (FIGS. 1 and 2) can be virtually any band for a cutoff saw generally known in the art. In the preferred embodiment, the band is that sold under the trademark MERCURY by American Saw and Manufacturing Company of East Longmeadow, Mass.

Figure 4:
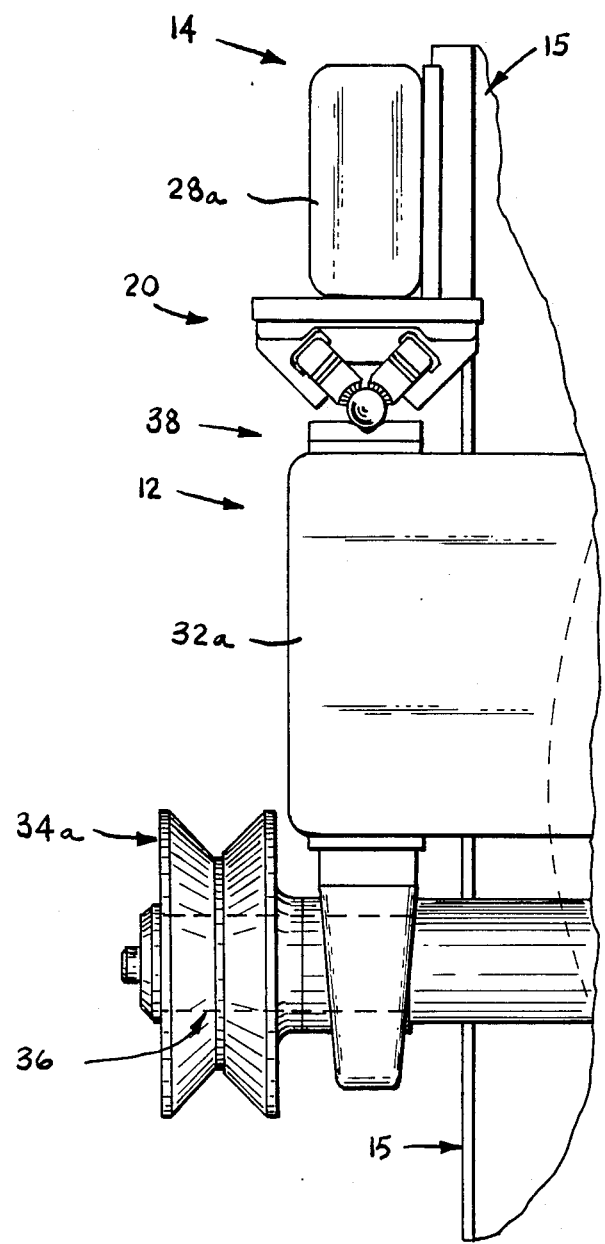
FIG. 4 is an enlarged view of the area within line IV in FIG. 2.
Figure 5:
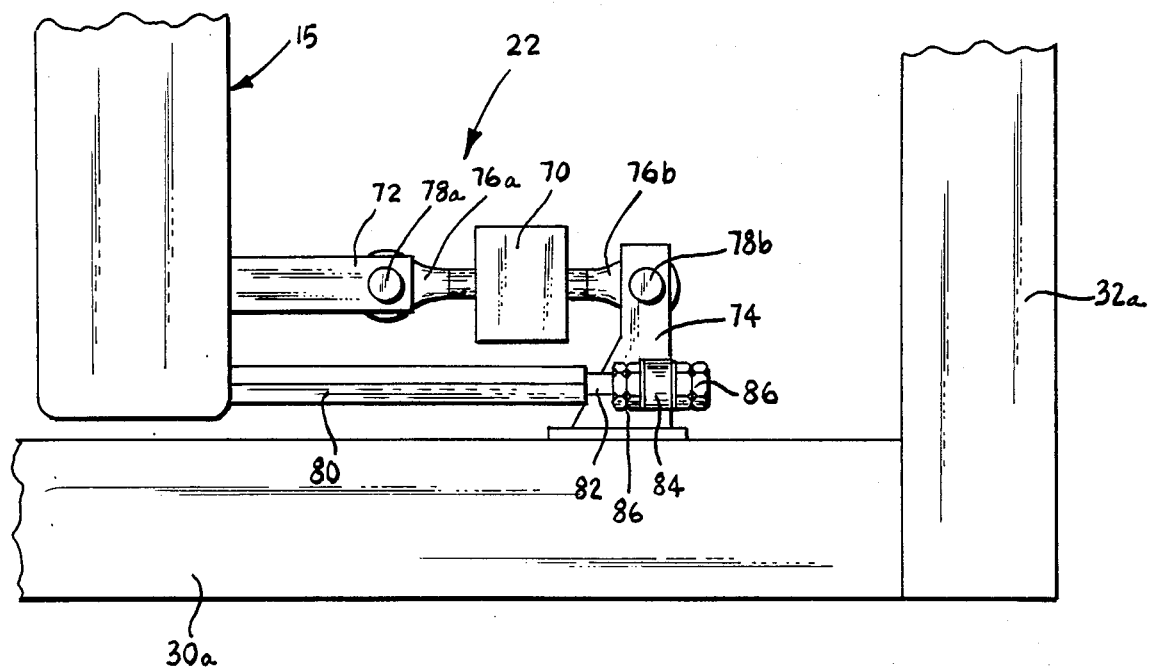
FIG. 5 is a fragmentary top plan view of the carriage, frame, and load cell.

Each of the frame rails 28 (FIGS. 3 and 4) is supported at its opposite ends on a slide bearing 20 which rides on a way 38. Consequently, the side rails 28 of the saw frame 14 are free to move horizontally with respect to side beams 30a of the carriage 12. Adjustable stops 42a and 42b are fixedly secured to side rails 30a, for example by welding, to limit the travel of rails 28 with respect to rails 30 during manufacture of the saw 10. In the preferred embodiment, the extent of travel from stop 42a to stop 42b is approximately two inches.

Load sensor assembly 22 (FIGS. 1-4) includes a load sensor 70 generally well known to those in the load sensor art. In the preferred embodiment, sensor 70 is that sold by Hottinger Baldwin as a 500 pound capacity shear beam load cell. A clevis 72 is welded to the frame housing 15; and a forked bracket 74 is bolted to side rail 30a. A first eye connector 76a extends from one side of the load cell 70 and is pinned to the clevis 72 by pin 78a. Similarly, a second eye connector 76b extends from the opposite side of the load cell 70 and is pinned to bracket 74 by pin 78b.

Load cell assembly 22 bears the entire horizontal force or load between the carriage 12 and the frame 14. Consequently, the horizontal load imposed on the saw band 16 is closely related and/or correlated to the load on sensor 70. The sensor 70 (see FIG. 6 also) outputs an analog signal on line 46 which is directly proportional to the load on the sensor. For example, when the load is zero pounds, the output is zero volts; while when the load is a maximum 500 pounds, the output is 27 millivolts (mV). Optionally, a damping device (not shown) can be incorporated into the load cell assembly 22 to prevent instantaneous spike loads from being imposed on sensor 22.

A pair of parallel fingers 80 are secured to and extend from the frame housing 15 and in turn support threaded shafts 82. Slides 84 are fixedly secured to the bracket 74 and slidingly interfit over the shafts 82. Stop nuts 86 on the shafts 82 limit the movement of the fingers 84 and therefore limit the relative movement of the carriage 12 and the frame 14.

Figure 6:
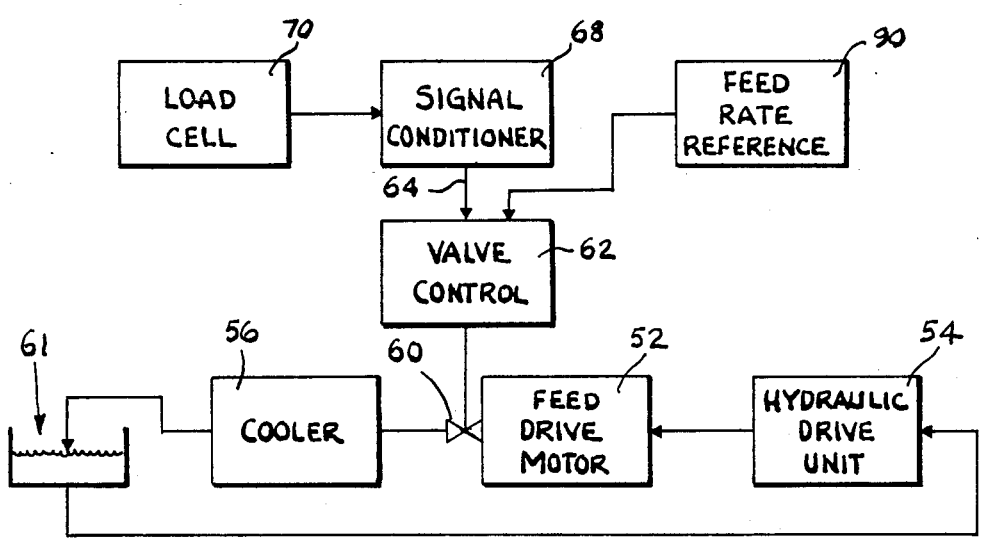
FIG. 6 is a schematic diagram of the load cell, hydraulic drive, and the drive control circuit.

The carriage drive mechanism and control circuit for the saw 10 is illustrated in FIG. 6. In the preferred embodiment, the drive unit is a hydraulic drive including a feed drive motor 52, a hydraulic drive unit 54, a cooler 56, a valve 60, and a reservoir 61. The drive unit 54 draws fluid from reservoir 61 and provides hydraulic fluid under pressure to the drive motor 52. Although not specifically shown, the drive motor 52 is operatively coupled to one or more of wheels 34 to propel the saw 10 during cutting and during return. Cooler 56 is interposed between the valve 60 and the reservoir 61 to cool the hydraulic fluid as necessary. The drive motor 52, drive unit 54, cooler 56, and reservoir 61 are all carried by the carriage 12 in conventional fashion as in the previously described Tannewitz saw.

Valve 60 (FIG. 6) in hydraulic line 58 is a proportional valve generally known in the valve art. In the preferred embodiment, the valve 60 is that sold as Model 2FRE10-4X10L by Rexroth. The proportional valve 60 is manifolded directly onto the drive motor 52. The valve 60 includes a valve control 62 for opening and closing the valve in response to a voltage delivered over line 64. The valve is variable between settings providing carriage speeds of 0.375 inch per minute and nine inches per minute corresponding to control voltages on line 64 of 0.375 volts and nine volts, respectively. Valve control 62 regulates proportional valve 60 so that the carriage 12 is driven at a velocity of one inch per minute for each volt applied over line 64. For example, a nine-volt signal on line 64 results in a carriage speed of nine inches per minute, while a four-volt signal on line 64 results in a carriage speed of four inches per minute.

Signal conditioner 68 (FIG. 6) is interposed in the circuit between load cell 70 and the control 62 to appropriately amplify and "clean up" the signal from the load cell 70 before it is applied to the control 62. In the preferred embodiment, the conditioner 68 amplifies the voltage from the load cell 333 times. Therefore the 0 to 27 mV signal from the cell 70 is amplified to the range 0 to 9 V for application to the control 62.

The feed rate reference or potentiometer 90 (FIG. 6) permits the user to input a desired initial speed. It is calibrated from 0.375 inch to 9 inches per minute and outputs a signal directly proportional thereto. For example, a selected feed rate of 4 inches per minute would cause the pot 90 to output a constant voltage of 4 V.

Operation

Before a material is cut, the saw 10 is moved to the right as viewed in FIG. 1 on rails 18 a sufficient distance to position the workpiece over the rails. A material to be cut (not shown) is positioned to the left of the saw 10 with the cut line appropriately aligned with the saw band 16. The user then selects band speed and feed rate based on data supplied by the saw band manufacturer for the size and content of the stock. The feed rate is entered on the feed select pot 90. The saw band drive motor (not shown) is actuated to propel the band 16 at the desired linear speed. The hydraulic drive is then actuated to carry the carriage 12, frame 14, and saw band 16 toward the material to be cut. The initial feed rate prior to material engagement is as selected on the pot 90.

As the saw band 16 engages the material, the band will be loaded in a direction opposite to the direction of travel. Because the saw frame 14 is free to move horizontally relative the carriage 12, the load on the band 16 is translated through the frame 14 to a load on the sensor assembly 22. The sensor 70 outputs an electrical signal from 0 to 27 mV (see FIG. 6) directly proportional to the load. The signal is appropriately modified in the signal conditioner 68 to be in the range 0 to 9 V to be applied to the control 62.

As noted above, the control 62 prior to material engagement applies the voltage to the valve control 62 received from the feed rate pot 90. Upon material engagement, the control samples the voltage from the signal conditioner 68 to sample the band load. In the preferred embodiment, the sampling rate is every 15 milliseconds (msec) for 0.5 second. The average of these samples is internally recorded as the reference load. Subsequently, the control 62 regulates the valve 60 in response to the load on cell 70. If the load exceeds the reference load, the valve 60 is closed as necessary to reduce the band load. If the load falls below the reference load, the valve 60 is opened as necessary to increase the load. The implementation of the control 62 is well within the scope of one skilled in the relevant art based on the present description.

It is envisioned that future enhancements will permit the user to input the desired band load directly, in which case the control 62 will make all necessary feed rate changes to effect the selected band loads. This currently is not implemented because band manufacturers specify only desired band speeds and feed rates and not desired band loads even though it is known that uniform band loads are desirable.

The life of the saw band 16 is greatly increased using the present saw because band loading is generally uniform in all cutting conditions. The control circuit slows the drive rate on the carriage when hard spots or relatively thick cross-sectional areas are encountered. Conversely, the control increases the drive speed of the carriage 12 when soft spots or relatively thin areas are being sawed. Accordingly, the saw performs cutting as quickly as possible while still preventing excessive load from being imposed on the band.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A saw comprising:
    a carriage;
    motive means for driving at least one of said carriage and a material to be cut relative one another at a variable speed along a horizontal path;
    a frame supported by said carriage and horizontally reciprocable with respect to said carrige generally parallel to the path;
    saw means supported by said frame for cutting a material as said carriage and the material are driven relative one another;
    sensor means for sensing the horizontal force between said carriage and said frame as said saw means cuts the material; and
    control means responsive to said sensor means for controlling said motive means to vary the drive speed to attempt to effect a desired load on said saw means.

2. A saw as defined in claim 1 wherein said sensor means bears the entire horizontal force between said carriage and said frame.

3. A saw as defined in claim 1 wherein said motive means includes hydraulic drive means having proportional valve means for regulating the flow of hydraulic fluid through said drive means, said proportional valve means being responsive to said control means.

4. A saw as defined in claim 1 further comprising limit means for limiting the horizontal travel of said frame with respect to said carriage.

5. A saw comprising:
    a carriage means supported on rollers for horizontal movement;
    power means for driving the carriage means in a first horizontal direction at a variable speed;

saw means supported by said carriage means for cutting a material as said carriage means is driven in the first horizontal direction;

sensor means responsive to the horizontal force exerted in the first horizontal direction by said saw means on the material; and control means coupled to said sensor means and said power means for varying the drive speed of said carriage means to effect a desired horizontal saw means load.

6. A saw as defined in claim 5 wherein said saw means includes:

a saw element; and frame means for supporting said saw element, said frame means being mounted for horizontal movement with respect to said carriage means.

7. A saw as defined in claim 6 wherein said sensor means comprises a load sensor for sensing the horizontal force between said frame means and said carriage means.

8. A saw as defined in claim 7 wherein said saw means further includes limit means for limiting the travel of said frame means with respect to said carriage.

9. A sawing apparatus comprising:

saw means for cutting a material;

frame means for supporting said saw means;

carriage means for supporting said frame means, said carriage means being horizontally movable in a first direction, said frame means being horizontally movable on said carriage means in the first direction;

driving means for driving said carriage means at a variable speed in the first direction to carry said saw means through the material;

sensor means for sensing the relative horizontal force between said carriage means and said frame means; and control means coupled to said sensor means and said driving means for regulating the speed at which said carriage means is driven by said driving means to attempt to maintain a desired relative force between said carriage means and said frame means, whereby a desired loading on said saw means is maintained.

10. A sawing apparatus as defined in claim 9 further comprising limit means for limiting the horizontal travel of said frame means with respect to said carriage means.

11. A sawing apparatus as defined in claim 10 further comprising roller means for supporting said frame means on said carriage means.

12. A sawing apparatus as defined in claim 9 further comprising roller means for supporting said carriage means.

13. A sawing apparatus as defined in claim 12 wherein said driving means comprises hydraulic drive means for driving said roller means, said hydraulic drive means including valve means for regulating the amount of hydraulic fluid flowing therethrough, said valve means being responsive to said control means.

* * * * *